(12) United States Patent
Sumiyoshi et al.

(10) Patent No.: US 8,315,868 B2
(45) Date of Patent: Nov. 20, 2012

(54) VEHICLE-MOUNTED VOICE RECOGNITION AND GUIDANCE APPARATUS

(75) Inventors: Yuki Sumiyoshi, Tokyo (JP); Tadashi Suzuki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 852 days.

(21) Appl. No.: 12/516,161

(22) PCT Filed: Sep. 27, 2007

(86) PCT No.: PCT/JP2007/068851
§ 371 (c)(1),
(2), (4) Date: May 22, 2009

(87) PCT Pub. No.: WO2008/084575
PCT Pub. Date: Jul. 17, 2008

(65) Prior Publication Data
US 2010/0049515 A1    Feb. 25, 2010

(30) Foreign Application Priority Data
Dec. 28, 2006  (JP) ................................ 2006-355785

(51) Int. Cl.
*G10L 17/00* (2006.01)
(52) U.S. Cl. ........................................... 704/246
(58) Field of Classification Search .............. 704/246
See application file for complete search history.

(56) References Cited

U.S. PATENT DOCUMENTS

| | | | | |
|---|---|---|---|---|
| 5,950,166 A | * | 9/1999 | Hab-Umbach et al. | 704/275 |
| 7,089,110 B2 | * | 8/2006 | Pechatnikov et al. | 701/411 |
| 2003/0023432 A1 | | 1/2003 | Kyomitsu | |
| 2004/0267528 A9 | * | 12/2004 | Roth et al. | 704/251 |
| 2005/0021341 A1 | * | 1/2005 | Matsubara et al. | 704/275 |
| 2005/0049878 A1 | * | 3/2005 | Nomura | 704/270 |
| 2006/0235694 A1 | * | 10/2006 | Cross et al. | 704/270.1 |
| 2007/0061150 A1 | * | 3/2007 | Sawano et al. | 704/275 |

FOREIGN PATENT DOCUMENTS

| | | |
|---|---|---|
| JP | 10-20884 A | 1/1998 |
| JP | 2001-22370 A | 1/2001 |
| JP | 2001-125591 A | 5/2001 |
| JP | 2001-166794 A | 6/2001 |
| JP | 2003-91299 A | 3/2003 |
| JP | 2003-108191 A | 4/2003 |
| JP | 2004-348657 A | 12/2004 |
| JP | 2005-84589 A | 3/2005 |
| JP | 2005-84590 A | 3/2005 |
| JP | 2006-189730 A | 7/2006 |

* cited by examiner

*Primary Examiner* — Michael N Opsasnick
(74) *Attorney, Agent, or Firm* — Birch, Stewart, Kolasch & Birch, LLP

(57) ABSTRACT

A vehicle-mounted voice recognition apparatus including a voice input unit for acquiring an inputted voice, a voice recognition unit for performing voice recognition on the acquired inputted voice, a guidance information output unit for providing a guidance on the basis of the result of the voice recognition, and a recognized word understanding degree determining unit for determining a user's degree of understanding of recognized words to the guidance according to the number of timeout times that a timeout has occurred in the user's operation which is monitored while the voice recognition unit performs the voice recognition, and the number of correction times that a correction has been made to the user's operation, so as to change the guidance provided by the guidance information output unit.

10 Claims, 6 Drawing Sheets

ST206 of Fig. 2 → Acquisition of User State (Except Tone) ~ST218 → Voice Recognition Process ~ST219 → Acquisition of User State (Tone) ~ST220 → to ST208 of Fig. 2

Determination Information About Degree of Understanding of Recognized Words

| Degree of Understanding of Recognized Words | Timeout Frequency (Times) | Correction Operation Frequency (Times) |
|---|---|---|
| 10 | 0 | 0 |
| 9 | 0 | 1~3 |
| 8 | 1~3 | 0 |
| 7 | 1~3 | 1~3 |
| 6 | 1~3 | 4~6 |
| 5 | 4~6 | 1~3 |
| ... | ... | ... |

FIG. 8

Determination Information About Degree of Understanding of Recognized Words

| Degree of Understanding of Recognized Words | Timeout Frequency (Times) | Correction Operation Frequency (Times) | Traveling Status |
|---|---|---|---|
| 10 | 0 | 0 | During Driving /Stationary |
| 9 | 0 | 1~3 | During Driving |
| 8 | 1~3 | 0 | During Driving |
| 7 | 1~3 | 1~3 | During Driving |
| 6 | 1~3 | 4~6 | During Driving |
| 5 | 0 | 1~3 | Stationary |
| 4 | 1~3 | 0 | Stationary |
| ... | ... | ... | ... |

FIG. 9

Determination Information About Degree of Understanding of Recognized Words

| Degree of Understanding of Recognized Words | Timeout Frequency (Times) | Correction Operation Frequency (Times) | Driving Operation Status | |
|---|---|---|---|---|
| | | | Reverse | Steering Wheel Angle |
| 10 | 0~3 | 0~3 | ○ | Large |
| 9 | 0~3 | 0~3 | ○ | Small |
| 8 | 0~3 | 0~3 | × | Large |
| 7 | 0~3 | 0~3 | × | Small |
| 6 | 4~6 | 0~3 | ○ | Large |
| 5 | 0~3 | 4~6 | ○ | Large |
| 4 | 4~6 | 0~3 | × | Small |
| ... | ... | ... | ... | ... |

FIG. 10

Determination Information About Degree of Understanding of Recognized Words

| Degree of Understanding of Recognized Words | Timeout Frequency (Times) | Correction Operation Frequency (Times) | User State |
|---|---|---|---|
| 10 | 0~3 | 0~3 | There Is No Sweating  Heart Rate Is Constant  Line of Sight Is Fixed  Tone Is Normal |
| 9 | 0~3 | 0~3 | There Is No Sweating  Heart Rate Is High  Line of Sight Is Fixed  Tone Is Normal |
| 8 | 0~3 | 0~3 | There Is No Sweating  Heart Rate Is High  Line of Sight Is Fixed  Tone Is Weak |
| 7 | 0~3 | 0~3 | There Is Sweating  Heart Rate Is High  Line of Sight Is Fixed  Tone Is Weak |
| 6 | 4~6 | 0~3 | There Is No Sweating  Heart Rate Is Constant  Line of Sight Is Fixed  Tone Is Normal |
| 5 | 0~3 | 4~6 | There Is No Sweating  Heart Rate Is Constant  Line of Sight Is Also Constant  Tone Is Normal |
| ... | ... | ... | ... |
| 1 | 0~3 | 0~3 | There Is Sweating  Heart Rate Is Very High  Line of Sight Is Not Fixed  Tone Is Weak |

VEHICLE-MOUNTED VOICE RECOGNITION AND GUIDANCE APPARATUS

FIELD OF THE INVENTION

The present invention relates to a vehicle-mounted voice recognition apparatus which can change a voice guidance and a guidance with a telop according to a user's degree of understanding of recognized words.

BACKGROUND OF THE INVENTION

A voice recognition apparatus has been incorporated into a car navigation system as voice recognition technology progresses. Thereby, even during driving of a vehicle, the user can search for a desired one of tens of thousands of facilities existing in the whole country safely while pinpointing the desired facility by simply uttering, for example, its address. Such a conventional voice recognition apparatus can also provide a voice guidance, such as a guidance to a destination, in response to a system operation performed by the user, and enables conversations in both directions.

As a voice recognition apparatus as mentioned above, a related art voice recognition apparatus which determines how much the user gets used to performing an operation from the number of times that a guidance has been provided to the user or the reaction time of the user, and increases the speed at which to provide a voice guidance and simplifies information about the guidance when the degree to which the user gets used to performing the system operation is higher than a predetermined level is known (for example, refer to patent reference 1).

Furthermore, a related art voice recognition apparatus which determines, as a level of the driving operation load on the user, vehicle speed information, handle steering angle information, and whether the vehicle is forwarding or reversing, and changes an automated voice guidance to the user on the basis of the determined driving operation load level is also known (for example, refer to patent reference 2).
[Patent reference 1] JP,2001-22370,A
[Patent reference 2] JP,2004-348657,A A problem with the technology disclosed by above-mentioned patent reference 1 is that the voice guidance can be automatically changed according to the degree to which the user gets used to performing the system operation, while if the user does not understand recognized words, any voice guidance suitable for the user cannot be provided.

Furthermore, a problem with the technology disclosed by above-mentioned patent reference 2 is that the method of automatically answering by voice can be changed on the basis of the user's driving operation load level, while in case in which the user cannot understand words which the user can utter using the technology because the user cannot catch the guidance (e.g., because he or she did not hear it), any voice guidance suitable for the user cannot be provided because the degree of understanding of recognized words is not determined for every user.

The present invention is made in order to solve the above-mentioned problems, and it is therefore a object of the present invention to provide a vehicle-mounted voice recognition apparatus which, even when a user cannot understand words which the user can utter because the user could not catch the guidance or did not hear the guidance, makes it easy for the user to catch the description of the guidance or enables the user to catch the description of the guidance by changing the description of the guidance so that the user can grasp words which the user can utter.

DISCLOSURE OF THE INVENTION

A vehicle-mounted voice recognition apparatus in accordance with the present invention includes: a voice input unit for acquiring an inputted voice; a voice recognition unit for performing voice recognition on the above-mentioned acquired inputted voice; a guidance information output unit for providing a guidance on a basis of a result of the above-mentioned voice recognition; and a guidance description determining unit for determining a user's degree of understanding of recognized words to the above-mentioned guidance according to a number of timeout times that a timeout has occurred in a user's operation which is monitored while the above-mentioned voice recognition unit performs the voice recognition, a number of correction times that a correction has been made to the user's operation, or both of the number of timeout times and the number of correction times so as to change the above-mentioned guidance.

In accordance with the present invention, even when the user cannot understand words which he or she can speak because the user could not hear the guidance or did not hear the guidance, the vehicle-mounted voice recognition apparatus makes it easy for the user to catch the description of the guidance or enables the user to catch the description of the guidance by changing the description of the guidance so that the user can grasp words which the user can utter.

BRIEF DESCRIPTION OF THE FIGURES

FIG. 8 is a view showing an example of a data table which the vehicle-mounted voice recognition apparatus in accordance with Embodiment 3 of the present invention uses;

FIG. 9 is a view showing an example of a data table which the vehicle-mounted voice recognition apparatus in accordance with Embodiment 4 of the present invention uses; and FIG. 10 is a view showing an example of a data table which the vehicle-mounted voice recognition apparatus in accordance with Embodiment 5 of the present invention uses.

PREFERRED EMBODIMENTS OF THE INVENTION

Hereafter, in order to explain this invention in greater detail, the preferred embodiments of the present invention will be described with reference to the accompanying drawings. Embodiment 1.

Figure 1:
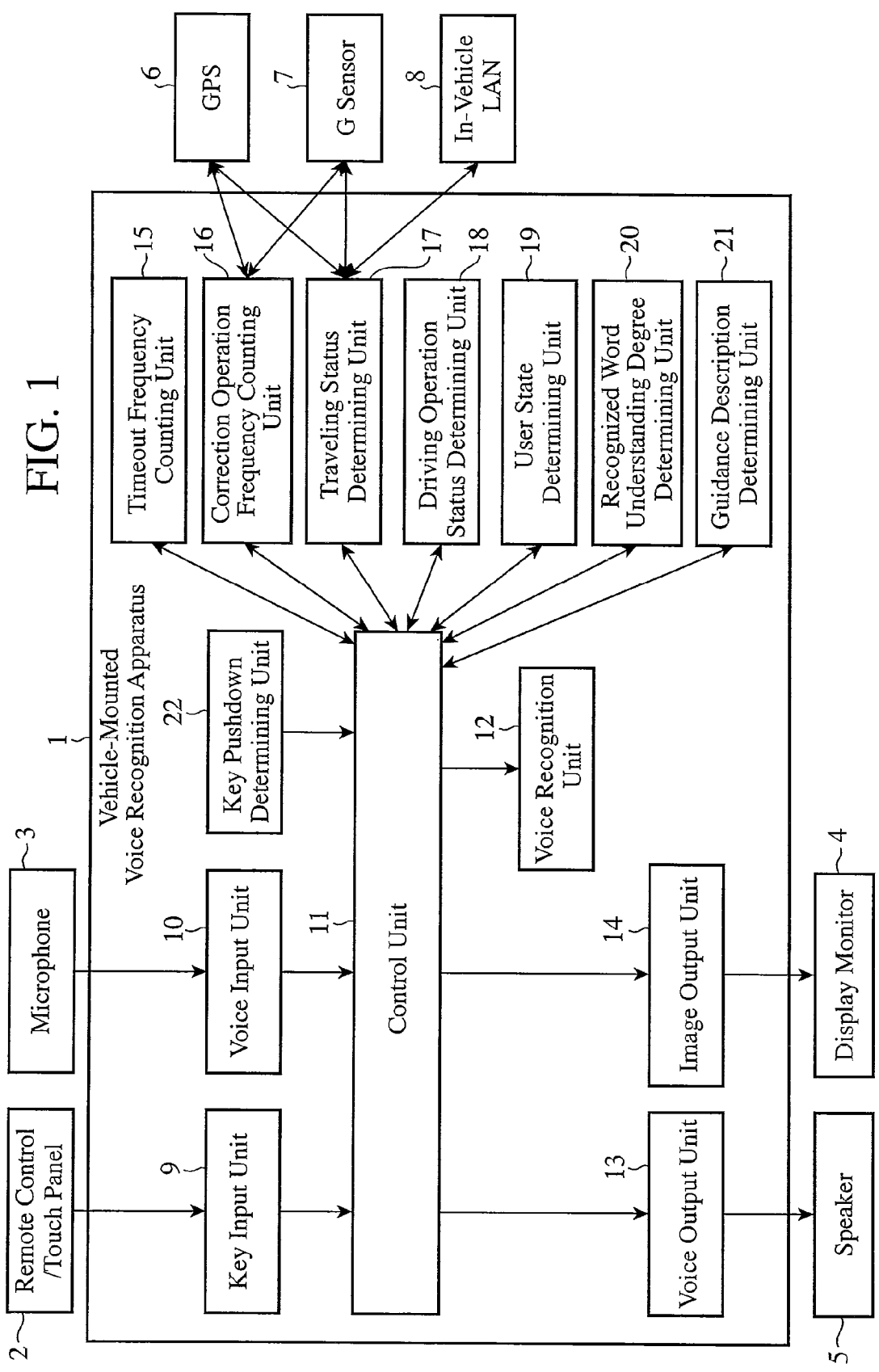
FIG. 1 is a block diagram showing the structure of a vehicle-mounted voice recognition apparatus in accordance with Embodiment 1 of the present invention.

FIG. 1 is a block diagram showing the structure of a vehicle-mounted voice recognition apparatus in accordance with Embodiment 1 of the present invention.

In FIG. 1, a remote control, a touch panel, and so on 2 for allowing a user to manipulate manually to input data such as a command, a microphone 3 for collecting the user's utterances for voice input, a display monitor 4 for displaying an image and a telop, a speaker 5 for outputting a sound, various types of sensors (in this case, a GPS (Global Positioning System) sensor 6 for determining the current position of a vehicle), a G sensor 7 for measuring the acceleration of the vehicle, and an in-vehicle LAN (Local Area Network) 8 for acquiring information including the speed of the vehicle, the steering wheel angle of the vehicle, and so on from external sensors are connected to the vehicle-mounted voice recognition apparatus 1 in accordance with Embodiment 1 of the present invention.

The vehicle-mounted voice recognition apparatus 1 is provided with a control unit 11 as a control center, and is comprised of a key input unit 9, a voice input unit 10, a voice recognition unit 12, a voice output unit 13, an image output unit 14, a timeout frequency counting unit 15, a correction operation frequency counting unit 16, a traveling status determining unit 17, a driving operation status determining unit 18, a user state determining unit 19, a recognized word understanding degree determining unit 20, a guidance description determining unit 21, and a key pushdown determining unit 22.

The key input unit 9 receives a command inputted from the remote control or touch panel 2, and furnishes the command to the control unit 11. The voice input unit 10 receives a command collected by the microphone 3, and furnishes the command to the control unit 11. The voice recognition unit 12 performs voice recognition, and delivers the recognition result to the control unit 11. The voice recognition result obtained by the voice recognition unit 12 is presented to the user by voice by the voice output unit 13, or is presented to the user via image by the image output unit 14.

The timeout frequency counting unit 15 counts the number of times that a timeout occurs while a voice operation is carried out and informs the counted timeout frequency to the control unit 11, and the correction operation frequency counting unit 16 counts the number of times that a correction operation is carried out while a voice operation is carried out and informs the counted correction operation frequency to the control unit 11. The traveling status determining unit 17 determines the traveling status of the vehicle showing whether the vehicle is stationary or traveling and informs the traveling status to the control unit 11, and the driving operation status determining unit 18 acquires the driving operation status of the vehicle including whether the vehicle is forwarded or reversed and the steering wheel state of the vehicle, and then informs the driving operation status to the control unit 11.

The user state determining unit 19 determines, for example, the user's state of mind from information including the user's sweating, heart rate, line of sight, tone, etc. which are acquired by sensors attached to the steering wheel of the vehicle and furnishes the user's state of mind to the control unit 11.

The recognized word understanding degree determining unit 20 acquires information from each of the timeout frequency counting unit 15, the correction operation frequency counting unit 16, the traveling status determining unit 17, the driving operation status determining unit 18, and the user state determining unit 19 under the control of the control unit 11, and determines the degree of understanding of recognized words indicating the degree to which the user understands words which can be voice-recognized and then informs the degree of understanding of recognized words to the control unit 11. The guidance description determining unit 21 changes either the voice guidance to be outputted to the user or the guidance using a telop or the like on the basis of the user's degree of understanding of recognized words outputted by the recognized word understanding degree determining unit 20 under the control of the control unit 11.

The key pushdown determining unit 22 determines either a pushdown pressure which occurs when the user pushes down a key of the remote control 2 or a key pushdown time interval during which the key is pushed down, and informs either the pushdown pressure or the key pushdown time interval to the control unit 11.

The control unit 11 consists of, for example, a microcomputer, and outputs a command to each of the above-mentioned control blocks 12 to 21 in order to perform a process corresponding to the command received from the key input unit 9 or the voice input unit 10. In this embodiment, the voice output unit 13 and the image output unit 14 are generically named as a guidance information output unit.

Figure 2:
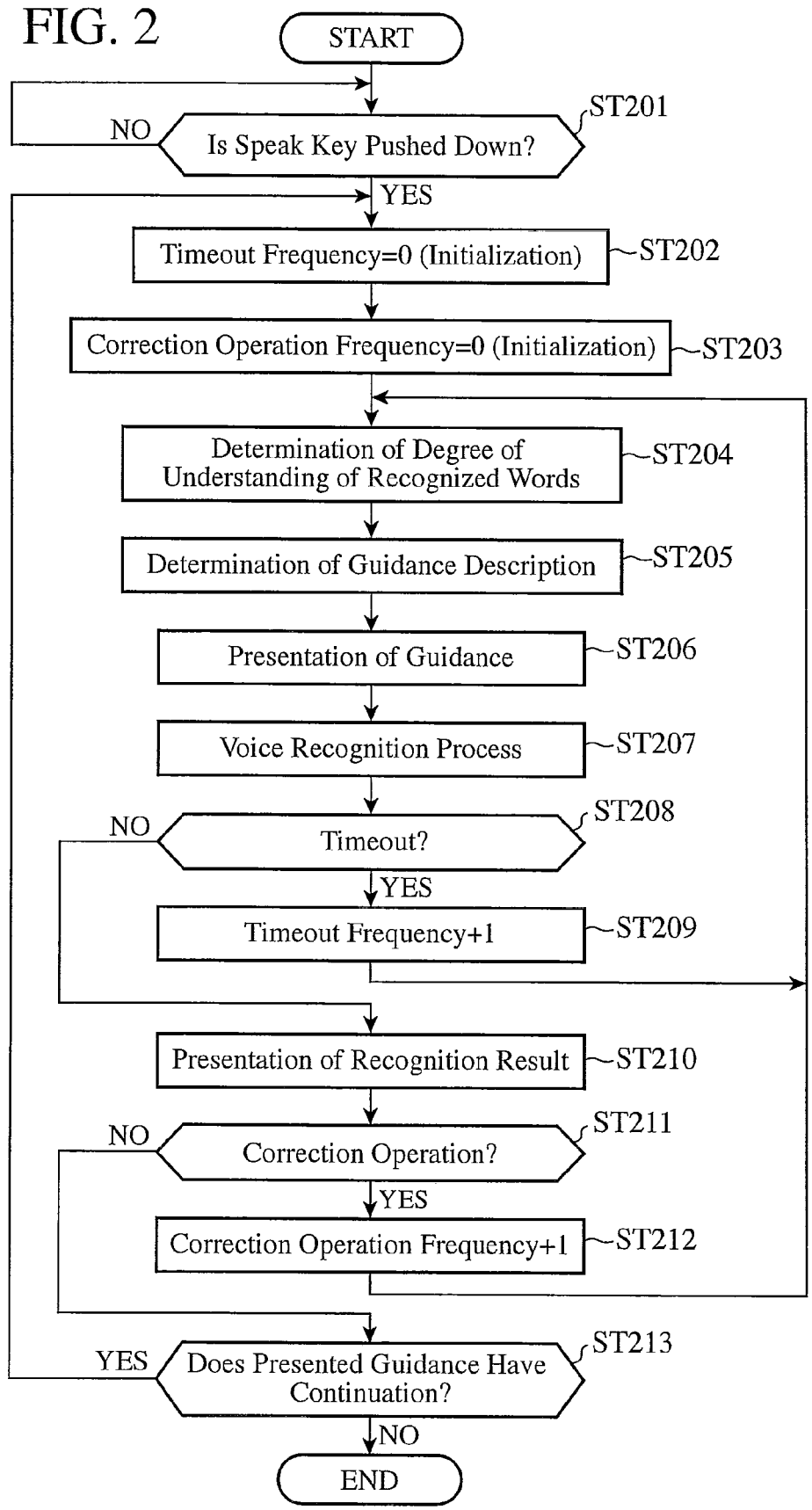
FIG. 2 is a flow chart which is referred to in order to explain the fundamental operation of the vehicle-mounted voice recognition apparatus in accordance with Embodiment 1 of the present invention.

FIG. 2 is a flow chart which is referred to in order to explain the fundamental operation of the vehicle-mounted voice recognition apparatus in accordance with Embodiment 1 of the present invention.

Hereafter, the operation of the vehicle-mounted voice recognition apparatus in accordance with Embodiment 1 shown in FIG. 1 will be explained in detail with reference to the flow chart shown in FIG. 2.

The control unit 11 always monitors a key input from the key input unit 9, and then determines whether a pushdown of an utterance key has occurred through manual operation first (step ST201). The vehicle-mounted voice recognition apparatus can carry out a voice recognition process according to a predetermined procedure which will be explained below when a pushdown of the utterance key has occurred (if "Yes" in step ST201).

In this embodiment, in order to start the voice recognition process in response to occurrence of a pushdown of the utterance key, the control unit 11 monitors a pushdown of the utterance key. In a case in which start of a voice input is alternatively defined by another operation, the control unit 11 monitors the other operation. When the utterance key is pushed down, the timeout frequency counting unit 15 sets the timeout frequency to zero (initialization) (step ST202) and the correction operation frequency counting unit 16 sets the correction operation frequency to zero (initialization) (step ST203).

Figures 6, 7:
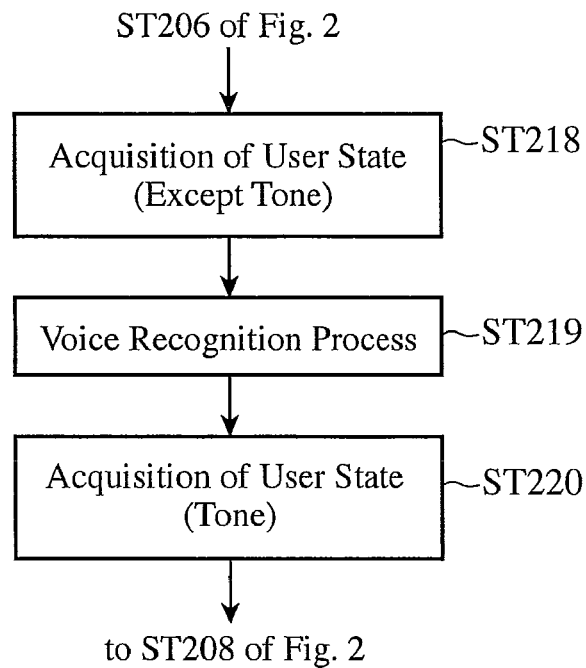
FIG. 6 is a flow chart which is referred to in order to explain the operation of a vehicle-mounted voice recognition apparatus in accordance with Embodiment 5 of the present invention.
FIG. 7 is a view showing an example of a data table which the vehicle-mounted voice recognition apparatus in accordance with any of Embodiments 1 and 2 of the present invention uses.

Next, the recognized word understanding degree determining unit 20 determines the user's degree of understanding of recognized words under the control of the control unit 11. Concretely, the recognized word understanding degree determining unit 20 stores, for example, determination information about the degree of understanding of recognized words as shown in FIG. 7 as table data, and refers to the table data so as to determine the user's degree of understanding of recognized words from the timeout frequency and the correction frequency (step ST204). In this embodiment, the recognized word understanding degree determining unit 20 determines the user's degree of understanding of recognized words from the timeout frequency and the correction frequency. As an alternative, the recognized word understanding degree determining unit can determine the user's degree of understanding of recognized words from any one of the timeout frequency and the correction frequency.

More specifically, because both the timeout frequency and the correction operation frequency are set to "0" in steps ST202 and ST203, the recognized word understanding degree determining unit determines that the degree of understanding is "10" from the table data shown in FIG. 6, and the guidance description determining unit 21 determines the description of the guidance on the basis of the determined user's degree of understanding of recognized words (step ST205). The guidance description determining unit 21 then starts either the voice output unit 13 or the image output unit 14 so as to present a voice guidance to the user or present a guidance to the user by displaying a telop (step ST206). The description of the guidance presented will be mentioned below.

Next, the voice recognition unit 12 starts performing a voice recognition process on a voice which is inputted thereto as a response to the guidance (step ST207), but, when the user does not make any voice input within a predetermined time interval and occurrence of a timeout is detected (if "Yes" in step ST208), the timeout frequency counting unit 15 updates the timeout frequency by +1 (step ST209) and the vehicle-mounted voice recognition apparatus returns to the process of step ST204 of making a determination of the user's recognized words from the determination information about the degree of understanding of recognized words. As shown in FIG. 6, the degree of understanding of recognized words becomes a low value as either of the timeout frequency and the correction operation frequency increases.

When occurrence of a timeout is not detected (if "No" in step ST208), the control unit 11 starts either the voice output unit 13 or the image output unit 14 so as to present the voice recognition result obtained by the voice recognition unit 12 to the user (step ST210).

The control unit 11 monitors a key input via the key input unit 9 after presenting the recognition result to the user, and determines whether or not a correction key is pushed down (step ST211). When the correction key is pushed down (if "Yes" in step ST211), the correction operation frequency counting unit 16 updates the correction operation frequency by +1 (step ST212) and the vehicle-mounted voice recognition apparatus returns to the process of step ST204 of making a determination of the user's degree of understanding of recognized words. When the correction key is not operated (if "No" in step ST211), the control unit 11 determines whether the vehicle-mounted voice recognition apparatus has to present a continuation of the guidance to the user (step ST213). Although the explanation has been made assuming that the correction operation is triggered by a pushdown of the correction key, in a case in which the correction operation is defined in such a way that the correction operation is triggered by another operation, the control unit 11 monitors the other operation.

When the guidance has a continuation (if "Yes" in step ST213), the vehicle-mounted voice recognition apparatus 1 returns to step ST202 in which it initializes the timeout frequency. In contrast, when the guidance has no continuation (if "No" in step ST213), the vehicle-mounted voice recognition apparatus ends the voice recognition process.

In accordance with above-mentioned Embodiment 1, the vehicle-mounted voice recognition apparatus can present a guidance which enables the user to understand words which can be voice-recognized by determining the user's degree of understanding of recognized words on the basis of the timeout frequency or the correction frequency, or both of them during the voice recognition process, and then changing the guidance.

Embodiment 2

In above-mentioned Embodiment 1, the vehicle-mounted voice recognition apparatus determines the user's degree of understanding of recognized words on the basis of the timeout frequency or the correction frequency, or both of them during the voice recognition process. In contrast, in Embodiment 2 which will be explained hereafter, a key pushdown determining unit 22 monitors a pushdown pressure which occurs at the time of a pushdown of a remote control key, a time interval during which the remote control key is pushed down, or both of them, and multiplies the counted correction frequency by a weight according to the pushdown pressure, the pushdown time interval, or both of them so as to reflect the pushdown pressure, the pushdown time interval, or both of them in the determination of the degree of understanding of recognized words.

For example, the key pushdown determining unit 22 carries out the weighting in such a way that when the user pushes down the key strongly, a recognized word understanding degree determining unit 20 determines that the degree of understanding is low, and the recognized word understanding degree determining unit 20 then determines the degree of understanding in consideration of the weight and changes a method of providing a guidance. The same goes for the pushdown time interval. At that time, the recognized word understanding degree determining unit 20 can refer to a data table in which determination information about the degree of understanding of recognized words, as shown in FIG. 7, is stored, like in the case of Embodiment 1. Hereafter, the operation of the vehicle-mounted voice recognition apparatus in accordance with Embodiment 2 will be explained in detail with reference to the fundamental operation shown in FIG. 2 and a flow chart shown in FIG. 3.

Processes of steps ST201 to ST211 of the fundamental operation shown in FIG. 2 are the same as those of Embodiment 1. When, in the process of step ST211, determining that a correction key has been pushed down (if "Yes" in step ST211), the vehicle-mounted voice recognition apparatus 1 carries out processes of step ST214 and a successive step shown in FIG. 3.

Figure 3:
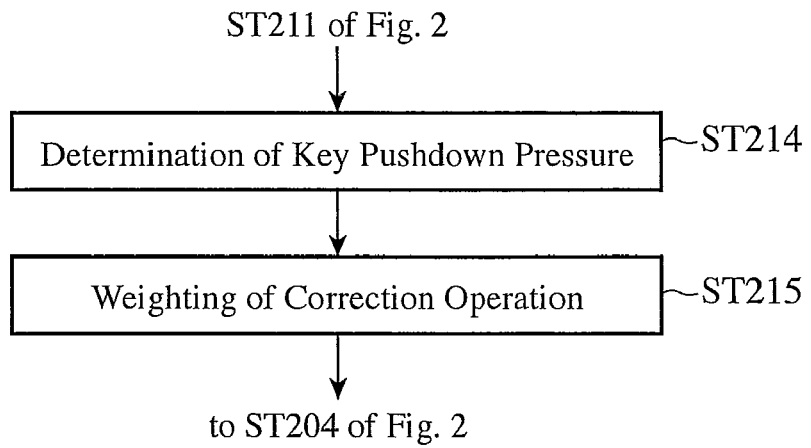
FIG. 3 is a flow chart which is referred to in order to explain the operation of a vehicle-mounted voice recognition apparatus in accordance with Embodiment 2 of the present invention.

In the flow chart of FIG. 3, the key pushdown determining unit 22, in step ST214, determines a pushdown pressure (strength) which occurs when the user pushes down the correction key assigned to a remote control and touch panel 2. The vehicle-mounted voice recognition apparatus can acquire the pushdown pressure from, for example, a piezo-electric sensor mounted under the correction key. For example, a correction operation frequency counting unit 16 carries out a process of counting the correction operation frequency with weight in such a way as to, when the key pushdown determining unit determines that the correction key has been pushed down strongly, increment the correction operation frequency by +2, whereas, the key pushdown determining unit determines that the correction key has been pushed down weakly, increment the correction operation frequency by +1 (step ST215), and returns to the process of step ST204 of the fundamental operation shown in FIG. 2 in which the vehicle-mounted voice recognition apparatus performs the process of determining the degree of understanding of recognized words. The key pushdown determining unit 22 can determine whether the correction key has been pushed down strongly or weakly by comparing the pushdown pressure with a reference pushdown pressure.

In accordance with above-mentioned Embodiment 2, because the recognized word understanding degree determining unit 20 reflects the key pushdown pressure outputted from key pushdown determining unit 22 in the determination of the user's degree of understanding of recognized words to the guidance, the vehicle-mounted voice recognition apparatus can present a guidance suitable for the user.

Embodiment 3

In above-mentioned Embodiments 1 and 2, the recognized word understanding degree determining unit 20 determines the user's degree of understanding of recognized words on the basis of the timeout frequency or the correction frequency, or both of them during the voice recognition. In contrast, a vehicle-mounted voice recognition apparatus in accordance with Embodiment 3 which will be explained hereafter also takes into consideration the traveling status of the vehicle determined by a traveling status determining unit 17 to make a determination of the user's degree of understanding of recognized words and present a guidance suitable for the user.

For example, when a timeout occurs while the vehicle is stationary, a recognized word understanding degree determining unit 20 determines that the user does not understand words which the user ought to be able to recognize because the timeout has occurred in spite of the fact that the noise is low while the vehicle is stationary, as compared with a time period during which the user is driving the vehicle, and therefore the user ought to have easily caught the guidance, and, as a result, causes the vehicle-mounted voice recognition apparatus to change the guidance. The vehicle-mounted voice recognition apparatus determines the traveling status of the vehicle by using the current position of the vehicle and the acceleration information, acquired by a GPS sensor 6 and a G sensor 7, respectively, or the information including the vehicle speed, the steering wheel angle, and so on, which are acquired via an in-vehicle LAN 8.

Figure 4:
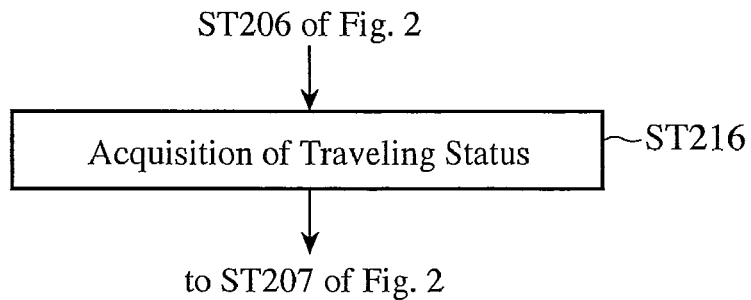
FIG. 4 is a flow chart which is referred to in order to explain the operation of a vehicle-mounted voice recognition apparatus in accordance with Embodiment 3 of the present invention.

Hereafter, the operation of the vehicle-mounted voice recognition apparatus in accordance with Embodiment 3 will be explained in detail with reference to the fundamental operation shown in FIG. 2 and a flow chart shown in FIG. 4.

Processes of step ST201 to ST206 shown, as the fundamental operation, in FIG. 2 are the same as those of above-mentioned Embodiments 1 and 2. The vehicle-mounted voice recognition apparatus 1 advances to a process of step ST216 shown in the flow chart of FIG. 4 after presenting a guidance to the user in step ST206. The traveling status determining unit 17, in step ST216, monitors the pieces of information from the GPS sensor 6, the G sensor 7, and so on, and then determines whether the vehicle is travelling or stationary and furnishes the determination result to the control unit 11, and the vehicle-mounted voice recognition apparatus returns to the process of carrying out the voice recognition process shown in FIG. 2 in step ST207 of the fundamental operation.

In this case, the recognized word understanding degree determining unit 20 stores, for example, determination information about the degree of understanding of recognized words shown in FIG. 8 as table data. Therefore, when providing a guidance for the user after a timeout has occurred or a correction operation has been performed, the recognized word understanding degree determining unit 20 refers to the above-mentioned data table so as to determine the user's degree of understanding of recognized words from the timeout frequency, the correction operation frequency, or both of them, and the traveling status of the vehicle (step ST204).

For example, when the timeout frequency is 1, the correction operation frequency is 0, and the traveling status shows that the vehicle s stationary, the recognized word understanding degree determining unit determines that the degree of understanding is "4" from the data table shown in FIG. 8. In this case, the recognized word understanding degree determining unit assumes that the user is not able to utter anything even though the vehicle is stationary, and sets the user's degree of understanding of recognized words to be low. A guidance description determining unit 21, in step ST205, changes the description of the guidance according to the user's degree of understanding which has been determined in step ST204. In this case, because the degree of understanding of recognized words determined in step ST204 is relatively low, the guidance description determining unit changes the description of the guidance so as to present the guidance more plainly. The description of the guidance will be mentioned below.

Because the recognized word understanding degree determining unit 20 In accordance with above-mentioned Embodiment 3 reflects the traveling status of the vehicle outputted from the traveling status determining unit 17 in the determination of the user's degree of understanding of recognized words to the voice guidance, the vehicle-mounted voice recognition apparatus can present a guidance suitable for the user.

Embodiment 4

A vehicle-mounted voice recognition apparatus in accordance with Embodiment 4 which will be explained hereafter includes a driving operation status determining unit 18 for determining a user's driving status, and is constructed in such a way that when a timeout occurs or a correction operation is carried out at the time of voice recognition, a recognized word understanding degree determining unit 20 performs a determination of the degree of understanding of recognized words in consideration of the user's driving status.

Figure 5:
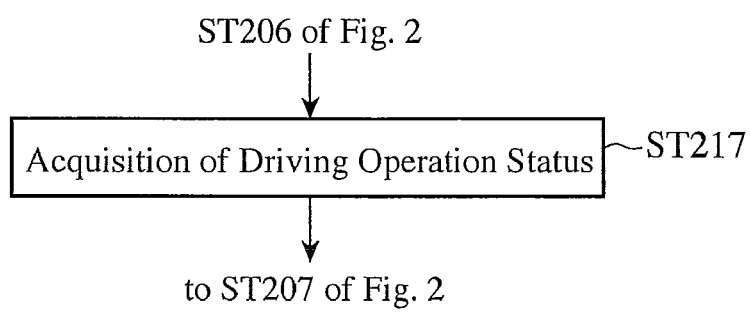
FIG. 5 is a flow chart which is referred to in order to explain the operation of a vehicle-mounted voice recognition apparatus in accordance with Embodiment 4 of the present invention.

For example, in a case in which a timeout occurs because the user is reversing the vehicle, the recognized word understanding degree determining unit 20 determines that the user's degree of understanding is normal (i.e., it is not low) and provides a guidance by taking into consideration that it is difficult for the user to make an utterance when reversing the vehicle. Hereafter, the operation of the vehicle-mounted voice recognition apparatus in accordance with Embodiment 4 will be explained in detail with reference to the fundamental operation shown in FIG. 2 and a flow chart shown in FIG. 5.

Processes of step ST201 to ST206 shown, as the fundamental operation, in FIG. 2 are the same as those of above-mentioned Embodiments 1, 2, and 3. The vehicle-mounted voice recognition apparatus 1 advances to a process of step ST217 shown in the flow chart of FIG. 5 after presenting a guidance to the user in step ST206.

The driving operation status determining unit 18, in step ST217, acquires, as the driving operation status, reverse information about the vehicle (whether or not the user is reversing the vehicle), information about the steering wheel angle, and so on. As the driving operation status, information including the vehicle speed which can be acquired via the in-vehicle LAN 8 or the like can be used. The driving operation status determining unit 18 returns to the process of step ST207 of the fundamental operation shown in FIG. 2 after acquiring the driving operation status in step ST217.

In this case, the recognized word understanding degree determining unit 20 stores, for example, determination information about the degree of understanding of recognized words shown in FIG. 9 as table data. Therefore, when providing a guidance for the user after a timeout has occurred or a correction operation has been performed, the recognized word understanding degree determining unit 20 determines the user's degree of understanding of recognized words from the timeout frequency, the correction operation frequency, or both of them, and the driving operation status. For example, when the timeout frequency is 1, the correction operation frequency is 0, the driving operation status indicates that the vehicle is reversing, and the user is turning the steering wheel largely (i.e., the steering wheel angle is large), the recognized word understanding degree determining unit determines that the degree of understanding of recognized words is "10" from the data table shown in FIG. 9. In this case, in consideration of the fact that a timeout has occurred, but the user is concentrating on turning the steering wheel, the recognized word understanding degree determining unit sets the degree of understanding to be relatively high. A guidance description determining unit 21, in step ST205, changes the description of the guidance according to the user's degree of understanding of recognized words which is determined in step ST204. For example, because the degree of understanding determined in step ST204 is relatively high, the guidance description determining unit does not perform the process of making the guidance easier to understand.

Because the recognized word understanding degree determining unit 20 In accordance with above-mentioned Embodiment 4 reflects the driving operation status of the vehicle outputted from the driving operation status determining unit 18 in the determination of the user's degree of understanding of recognized words to the voice guidance, the vehicle-mounted voice recognition apparatus can present a guidance suitable for the user.

Embodiment 5

A vehicle-mounted voice recognition apparatus in accordance with Embodiment 5 which will be explained hereafter further includes a user state determining unit 19 for determining a user's state of mind from signals detected by sensors installed in, for example, the steering wheel of the vehicle or the like, and is constructed in such a way that when a timeout occurs or a correction operation is carried out at the time of voice recognition, a recognized word understanding degree determining unit 20 determines the degree of understanding in consideration of the user's state.

For example, when the user's heart rate has gone up, the recognized word understanding degree determining unit 20 determines that the user does not get used to performing a voice operation or the like, and makes the vehicle-mounted voice recognition apparatus change the guidance by determining that the user's degree of understanding of recognized word is low. In this case, it can be considered that as the user's state, the user's sweating, heart rate, and line of sight are sensed, or the user's tone at the time of the voice input is used. Hereafter, the operation of the vehicle-mounted voice recognition apparatus in accordance with Embodiment 5 will be explained in detail with reference to the fundamental operation shown in FIG. 2 and a flow chart shown in FIG. 6.

Processes of step ST201 to ST206 shown, as the fundamental operation, in FIG. 2 are the same as those of above-mentioned Embodiments 1 and 2. The vehicle-mounted voice recognition apparatus 1 advances to a process of step ST218 shown in FIG. 6 after presenting a guidance to the user in step ST206.

The user state determining unit 19, in step ST218, acquires the user's state of mind by sensing the user's sweating, heart rate, and line of sight. A voice recognition processing unit 12 then, in step ST219, performs a recognition process on the voice which is inputted thereto in response to the guidance, and then advances to a process of step ST220. The user state determining unit 19, in step ST220, acquires the user's tone at the time of the voice input, and returns to the process of step ST208 of the fundamental operation of FIG. 2.

The recognized word understanding degree determining unit 20 stores determination information about the degree of understanding of recognized words shown in FIG. 10 therein as a data table. Therefore, when providing a guidance for the user after a timeout has occurred or a correction operation has been performed, the recognized word understanding degree determining unit 20, in step ST204, determines the user's degree of understanding of recognized words from the timeout frequency, the correction operation frequency, or both of them, and the user state.

For example, when the timeout frequency is 1, the correction operation frequency is 0, and it has been determined that, as the user state, the user has sweating, the user's heart rate is high, the user's line of sight is not fixed (moving), or the user's tone is weak, the recognized word understanding degree determining unit sets the degree of understanding to be "1" by referring to the above-mentioned data table. In this case, in consideration of the fact that a timeout has occurred, but the user is in a state in which the user does not know words which the user can utter, the recognized word understanding degree determining unit sets the degree of understanding to be relatively low. The guidance information determining unit 21, in step ST205, changes the description of the guidance according to the degree of understanding of recognized words determined in step ST204. In each, because the degree of understanding determined in step ST204 is relatively low, the guidance description determining unit changes the description of the guidance so as to present the guidance more plainly. The description of the guidance will be mentioned below.

Because the recognized word understanding degree determining unit 20 In accordance with above-mentioned Embodiment 5 reflects the information about the user's state of mind outputted from the user state determining unit 19 in the determination of the user's degree of understanding of recognized words to the voice guidance, the vehicle-mounted voice recognition apparatus can present a guidance suitable for the user.

Hereafter, the method of changing the guidance in accordance with any of above-mentioned Embodiments 1 to 5 will be explained. The guidance information determining unit 21 determines whether to change the guidance information on the basis of the user's degree of understanding of recognized words which is outputted by the recognized word understanding degree determining unit 20. The changed guidance information is outputted by voice by the voice output unit 13 (the speaker 5) via the control unit 11, or is outputted via image by the image output unit 14 (the display monitor 4) via the control unit 11.

When the user's degree of understanding of recognized words is low, the guidance description determining unit 21 makes the guidance have a detailed description so that the user can grasp words which the user can utter. The guidance description determining unit provides the detailed guidance by preparing two or more messages in advance, and switching between them, or by using a method of generating the detailed guidance dynamically. In an example of the changing method, the voice output unit 13 or the image output unit 14, in step ST206 of the fundamental operation shown in FIG. 2, presents "Please tell about a continuation of the address", and the vehicle-mounted voice recognition apparatus then returns to the process of step ST204 when a timeout occurs or a correction operation is performed, and, when, in step ST204, determining that the user's degree of understanding is low, changes the guidance to "Please tell about city, ward, town, or village name, or address number." Furthermore, it can be considered that after a timeout has occurred or a correction operation has been performed due to erroneous recognition, the vehicle-mounted voice recognition apparatus returns to the process of step ST204 again, and, when the vehicle-mounted voice recognition apparatus, in step ST204, determines that the user's degree of understanding is low, the voice output unit 13 or the image output unit 14 presents "Please tell about something like 2-chome, Miwa, Sanda-shi".

In addition, it can be considered that when the user's degree of understanding of recognized words is low, the guidance description determining unit 21 sets the speed at which to provide a guidance to be a relatively slow level so that the user can grasp words which the user can utter. In this case, the guidance information determining unit 21 sets up a certain speed level at which to provide a guidance in advance, and, when the guidance information determining unit, in step ST205 of the fundamental motion of FIG. 2, determines that the degree of understanding is low, the guidance description determining unit 21 needs to reset up the speed level.

Furthermore, when the user's degree of understanding of recognized words is low, the vehicle-mounted voice recognition apparatus reminds the user to pay attention to the guidance by using a sound or an image, or both of them at the time of starting the guidance so as to force the user to pay attention to the guidance, so that the user can grasp words which the user can utter from the description of the guidance. The guidance description determining unit 21 prepares the sound (a beep sound) or the like which the vehicle-mounted voice recognition apparatus plays at the time of starting the guidance in advance, and, only when the vehicle-mounted voice recognition apparatus plays the sound in step ST205 of the fundamental operation shown in FIG. 2, makes a setting. The vehicle-mounted voice recognition apparatus can prepare two or more types of sounds which the vehicle-mounted voice recognition apparatus can play at the time of starting the guidance, and can use one of them properly according to the degree of understanding of recognized words.

Furthermore, it can be considered that when the user's degree of understanding is low, the vehicle-mounted voice recognition apparatus increases the sound volume of a portion in the guidance description showing words which the user can utter so as to make the user grasp words which the user can utter. In this case, the guidance description determining unit 21 holds, as information, that it is the portion in the guidance description showing words which the user can utter in advance, and is enabled to set up the sound volume level.

In step ST205 of the fundamental operation shown in FIG. 2, the guidance description determining unit 21 needs to reset up the sound level of the portion in the guidance description showing words which the user can utter (e.g., increases the sound volume or maintains the sound volume of the words which the user can utter while lowering the sound volume of the other portion).

Furthermore, when the user's degree of understanding of recognized words is low, the vehicle-mounted voice recognition apparatus can change the display form of the guidance which is displayed on the screen. For example, the vehicle-mounted voice recognition apparatus enlarges the characters of the portion in the guidance description showing words which the user can utter, bolds the characters, changes the color of the characters, or highlights the characters. By thus controlling the screen display in such a way as to make the screen display more legible, the image output unit 14 makes the user grasp words which the user can utter. As an alternative, the image output unit 14 can prepare a character string to be displayed in the guidance whose display form is changed in advance, or can generate a character string dynamically.

It can be considered as an example of the changing method that the vehicle-mounted voice recognition apparatus, in step ST206 of the fundamental operation shown in FIG. 2, displays "Please tell about an address or a facility" on the screen, and, when returning to the process of step ST204 after a timeout has occurred or a correction operation has been carried out, and then, in step ST204, determining that the user's degree of understanding is low, makes the image output unit 14 highlight the display of the guidance "Please tell about an address or a facility".

Furthermore, when the user's degree of understanding is low, the vehicle-mounted voice recognition apparatus can also make the user grasp words which the user can utter by combining the above-mentioned guidance changing methods. In an example of such a changing method, the vehicle-mounted voice recognition apparatus, in step ST206 of the fundamental operation of FIG. 2, presents "Please tell about something if a beep is heard", and, when returning to the process of step ST204 after a timeout has occurred or a correction operation has been carried out, and then, in step ST204, determining that the user's degree of understanding is low, changes the guidance by voice to a beep sound+"Please tell about an address or a facility". The vehicle-mounted voice recognition apparatus can also change the screen display to something like "Please tell about an address or a facility".

As previously explained, the vehicle-mounted voice recognition apparatus 1 in accordance with any of Embodiments 1 to 5 of the present invention makes the recognized word understanding degree determining unit 20 determine the user's degree of understanding of recognized words to guidance from at least the timeout frequency or correction frequency to the user's operation, which is monitored during the voice recognition process by the voice recognition unit 12, or both of them, and controls the guidance description determining unit 21 to change the guidance provided by the guidance information output unit (the voice output unit 13 or the image output unit 14). At that time, the vehicle-mounted voice recognition apparatus can make the guidance appropriate for the user by changing the guidance by voice or via screen display, changing the speed at which to provide the guidance by voice, or changing the display form of the guidance according to the user's degree of understanding of recognized words.

In addition, by indicating by a beep sound the start of the guidance, or increasing the sound volume of the portion showing words which the user can utter and included in the guidance from the vehicle-mounted voice recognition apparatus 1, the vehicle-mounted voice recognition apparatus can call the user's attention to the guidance from the vehicle-mounted voice recognition apparatus 1 when the user has a low degree of understanding of recognized words because the user does not hear the guidance or cannot catch the guidance, and therefore can make the guidance appropriate for the user.

The function of each of the plurality of blocks 9 to 21 which construct the above-mentioned vehicle-mounted voice recognition apparatus 1 can be implemented by the control unit 11's reading and executing a corresponding program stored in a not-shown memory built in the vehicle-mounted voice recognition apparatus 1. Those blocks do not represent only those which are substantially distinguished from other blocks of the control unit 11 and are built in the control unit 11, and are expressed separately from one another strictly for the sake of simplicity. All of the function of each of the plurality of above-mentioned blocks can be implement via software, or at least a part of the function can be implemented via hardware. In this case, the data table shown in FIGS. 6 to 10 can be allocated to the not-shown memory as mentioned above and can be registered beforehand.

INDUSTRIAL APPLICABILITY

As mentioned above, the vehicle-mounted voice recognition apparatus in accordance with the present invention changes the description of a voice guidance so as to enable the user to easily catch the guidance and grasp words which the user can utter. Therefore, the vehicle-mounted voice recognition apparatus in accordance with the present invention is suitable for use in a car navigation system and the like

The invention claimed is:

1. A vehicle-mounted voice recognition apparatus comprising:
    a voice input unit for acquiring an inputted voice;
    a voice recognition unit for performing voice recognition on said acquired inputted voice;
    a guidance information output unit for providing a guidance on a basis of a result of said voice recognition; and
    a guidance description determining unit for determining a user's degree of understanding of recognized words to said guidance according to a number of timeout times that a timeout has occurred in a user's operation which is monitored while said voice recognition unit performs the voice recognition, a number of correction times that a correction has been made to the user's operation, or both of the number of timeout times and the number of correction times so as to change said guidance.

2. The vehicle-mounted voice recognition apparatus according to claim 1, wherein said apparatus has a key pushdown determining unit for determining a key pushdown pressure when an input for correction is made through a key operation, and said recognized word understanding degree determining unit reflects the key pushdown pressure or a pushdown time outputted from said key pushdown determining unit in the determination of the user's degree of understanding of recognized words to the voice guidance.

3. The vehicle-mounted voice recognition apparatus according to claim 1, wherein said apparatus has a traveling status determining unit for determining traveling conditions of a vehicle from a signal detected by a sensor, and said recognized word understanding degree determining unit reflects the traveling conditions of the vehicle outputted from said traveling status determining unit in the determination of the user's degree of understanding of recognized words to the voice guidance.

4. The vehicle-mounted voice recognition apparatus according to claim 1, wherein said apparatus has a driving operation status determining unit for determining a vehicle driving operation status from a signal detected by a sensor, and said recognized word understanding degree determining unit reflects the vehicle driving operation status outputted from said driving operation status determining unit reflect in the determination of the user's degree of understanding of recognized words to the voice guidance.

5. The vehicle-mounted voice recognition apparatus according to claim 1, wherein said apparatus has a user state determining unit for determining the user's state of mind from a signal detected by a sensor, and said recognized word understanding degree determining unit reflects the user's state of mind outputted from said user state determining unit reflect in the determination of the user's degree of understanding of recognized words to the voice guidance.

6. The vehicle-mounted voice recognition apparatus according to claim 1, wherein said guidance information output unit changes said guidance according to the user's degree of understanding of recognized words which is determined by said recognized word understanding degree determining unit.

7. The vehicle-mounted voice recognition apparatus according to claim 1, wherein said guidance information output unit sets a speed at which to provide said voice guidance to be variable according to the user's degree of understanding of recognized words which is determined by said recognized word understanding degree determining unit.

8. The vehicle-mounted voice recognition apparatus according to claim 1, wherein said guidance information output unit notifies a start of said guidance by sound, display, or both of them according to the user's degree of understanding of recognized words which is determined by said recognized word understanding degree determining unit.

9. The vehicle-mounted voice recognition apparatus according to claim 1, wherein said guidance information output unit sets a sound volume of a portion showing words to be uttered included in said voice guidance to be variable on a basis of the user's degree of understanding of recognized words which is determined by said recognized word understanding degree determining unit.

10. The vehicle-mounted voice recognition apparatus according to claim 1, wherein said guidance information output unit changes a display form in which said guidance information output unit displays the guidance to a screen on a basis of the user's degree of understanding of recognized words which is determined by said recognized word understanding degree determining unit.

* * * * *